April 18, 1950 L. FRANKEL 2,504,317
MAGAZINE SUPPORT AND RELEASE
Filed Nov. 9, 1948
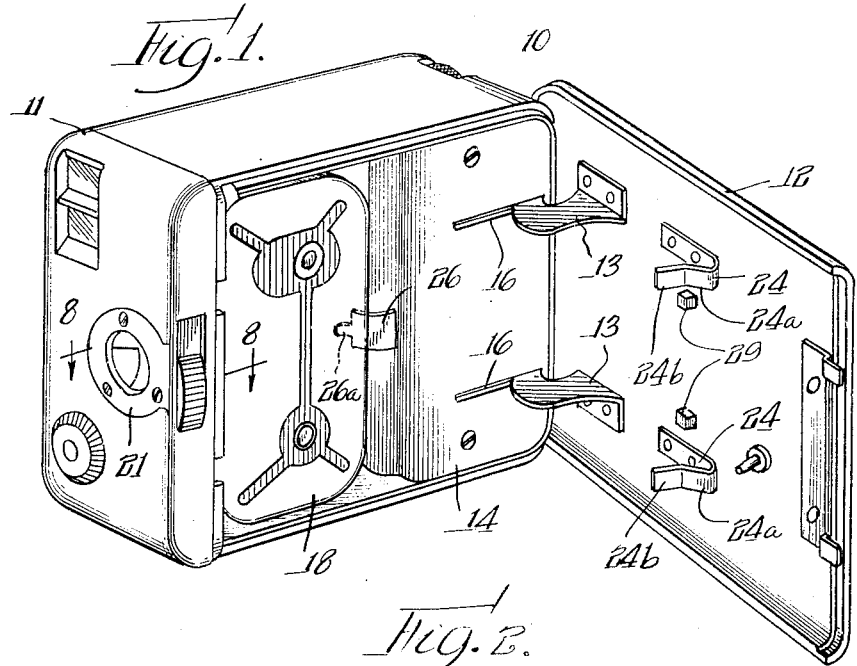
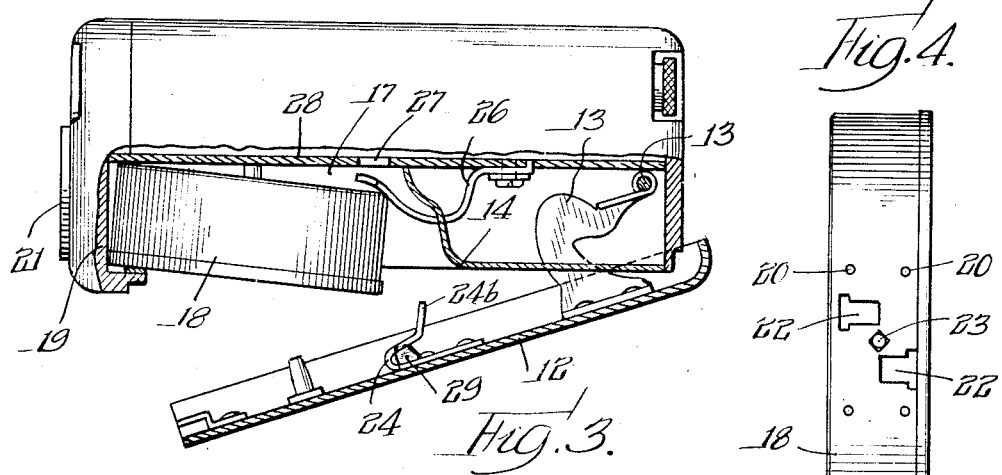
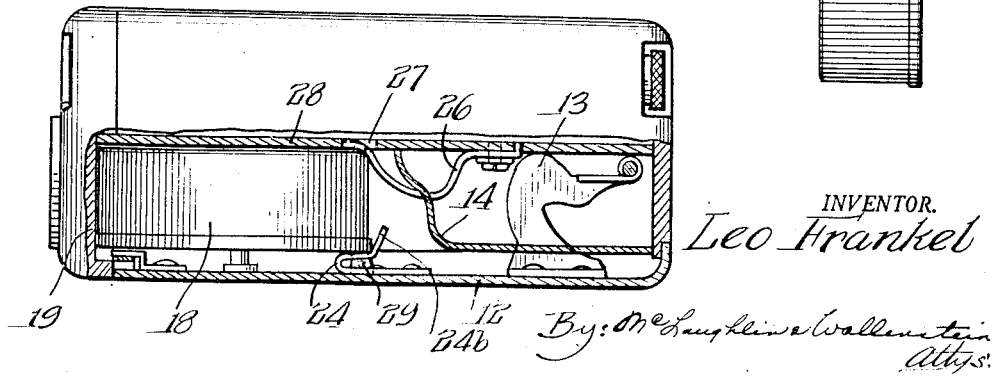
INVENTOR.
Leo Frankel
By: McLaughlin & Wallenstein
Attys.

Patented Apr. 18, 1950

2,504,317

UNITED STATES PATENT OFFICE 2,504,317

MAGAZINE SUPPORT AND RELEASE

Leo Frankel, Chicago, Ill., assignor, by mesne assignments, to City National Bank and Trust Company of Chicago, as trustee Application November 9, 1948, Serial No. 59,072

6 Claims. (Cl. 88—17)

My invention relates, in general, to motion picture cameras. It relates more in particular to improved means for supporting and ejecting a magazine from such cameras.

When magazine cameras and magazines of the type disclosed in Nagel Patent No. 2,262,553 and Wittel Patent No. 2,262,570 are employed, it is essential that the magazine be very accurately and positively seated within the magazine chamber so that the projections provided on the camera will enter the corresponding holes in the magazine and properly position the pressure plate of the magazine and, also, so that the mechanism for controlling the magazine shutter be properly registered. To properly seat the magazine and hold it in proper register with respect to the camera, as determined by the aforesaid projection, pressure plate, and the like, it is necessary that the magazine be continuously resiliently biased in a direction toward the camera shutter and that it also be held firmly, but resiliently, against the bottom of the magazine chamber. Conventionally, a pair of springs, such as shown in the aforesaid Nagel patent, are employed; one, to urge the magazine forwardly and the other, to urge it downwardly. Magazine supports of this character, while advantageous in many respects, have the disadvantage that the magazine becomes rather firmly held within the magazine chamber and usually separate ejecting mechanism is provided for its release when removal is desired. Provision of separate ejecting mechanism not only adds to the cost of a camera and adds to the engineering problems, but is frequently not used by the operator of the camera who seems to prefer prying the magazine up with the fingers or some instrument. It has been proposed that the magazine chamber be so constructed that the fingers can enter the magazine chamber to grasp the magazine for its removal, but this idea introduces problems of design, space factors, and the like.

The object of my invention is the provision of a support for a magazine within a motion picture camera which will automatically eject the magazine when the cover enclosing the magazine is opened.

Another object is the provision of a camera-magazine combination which eliminates the problems hereinabove.

Additional specific objects and features of the invention will be brought out in the description of the embodiment of the invention shown in the drawings, wherein Fig. 1 is a perspective view of a camera with its cover opened and showing the magazine in place in the magazine chamber;

Fig. 2 is a view looking at the top of the camera, with the cover and a portion of the case broken away to show the position of the magazine when the cover is opened;

Fig. 3 is a view similar to Fig. 2, but showing the camera cover closed and locked; and Fig. 4 is a view looking at the edge of the magazine and illustrating some of the features thereof.

Referring now to the drawings, the camera, there shown, comprises a case 10 with a front plate 11 and hinged cover 12. The manner of hinging is not of particular importance, but it will be noted that there are hinges 13 secured to the cover and pivoted to a cross piece, carried by the case beneath a panel 14, which panel is slotted at 16 to pass the hinges 13. The panel 14 forms one side of a magazine chamber 17 in which a magazine 18 is adapted to be housed. Opposite to the panel 14 is a wall 19, also forming one side of the magazine chamber. The wall 17 has the usual aperture (not shown) for admitting light from a suitable objective lens mounted on the case and having its focal plane within the magazine chamber.

The magazine intended to be used is of a type having openings 20 into which projections (not shown) on the wall 19 enter to fix the position of the magazine pressure plate, against which the film rides, accurately with respect to the camera objective lens, which in the embodiment shown is adapted to be supported on a lens mount 21. The magazine shown is of the 8 mm. type with shutters 22 which are opened and closed by a shutter pin 23 turned as an incident to locking of the camera cover 12, but it will be understood that the magazine may be of a type not requiring utilizing this arrangement, as, for example, the usual 16 mm. magazine. In the operation of a magazine, the film is advanced by the camera claw and a take-up is provided at the bottom of the magazine chamber which, through a slip clutch drive in the camera, takes up the film at a predetermined torque, and it is essential that the magazine be properly seated with respect to this take-up connection.

In carrying out my invention, I employ a pair of springs 24, which are secured to the cover and adapted to engage against the top rear edge of the magazine and a spring 26 which is secured to the camera case and is adapted to engage against the bottom rear edge of the magazine. Together, these springs urge the magazine forwardly and the spring 26 functions to eject the magazine. Looking further into the construction and operation of these springs, it will be noted that the springs 24 comprise a portion 24a which is at an acute angle to the portion of the springs secured to the cover and a portion 24b which is at approximately an 80 degree angle to the portion of the springs fastened to the cover when in the position shown in Fig. 1. The primary function of the portion 24a is to urge the magazine downwardly, while the primary function of the portion 24b is to urge the magazine forwardly, but both participate somewhat in each function. So far as the forward component is concerned, the springs 24 cooperate with spring 26.

Looking at spring 26, it will be noted that it comprises a rounded portion where it engages the magazine, thus, because of the manner in which it is mounted, forming a rough U figure. The free end of the spring has a tip 26a which engages under the magazine, and which when the magazine is completely housed, with the cover closed, extends into a recess 27 on the plate 28, which is the same plate to which spring 26 is secured. Looking particularly at Fig. 1, it will be noted that a portion of spring 26 projects through an opening in the panel 14, and obviously it is only the projecting portion of spring 26 which is significant in its association with the magazine, the remaining portion comprising the means for mounting and imparting adequate resiliency. By permitting the tip 26a to enter the opening 27, the magazine can be forced downwardly snugly against the plate 28, it being only the tip 26a which extends below the magazine when it is positioned for exposure. Thus, it will be seen that because of the combined action of springs 24 and 26, the magazine is forced forwardly, and it is the tip 26a which functions to release the magazine to the point indicated in Fig. 2 when the cover is opened and the magazine released from contact with springs 24. The springs 24, together, have somewhat greater strength than the spring 26, and there being two of them, they tend to equalize the pressure and prevent canting of the magazine, such as might occur when only a single spring is employed.

While the springs 24 are designed to maintain resilient pressure against the top rear edge of the magazine and hold it in position, both forwardly and downwardly, something could develop which would tend to prevent a proper seating of the magazine against the plate 28. If, for example, a foreign substance should accidentlly be lodged below the magazine or any other eventuality develop which would tend to prevent adequate seating of the magazine, the springs 24 alone might possibly compress sufficiently to permit complete closing of the cover and operation of the latching mechanism, which is partly shown in the drawings, but which is not described because this invention is not primarily concerned herewith. If such a contingency should develop, it might be possible to lock the cover and operate the camera, but the pictures which would be taken would at best be defective. I, therefore, provide means for positively seating the magazine in the form of a pair of projections 29 on the cover, which engage the magazine as the cover is coming to its completely closed position and after the springs 24 have preliminarily engaged the cover and, presumably, operated in the intended manner. These projections so engage the magazine that if the magazine should not be seated sufficiently close to the plate 28 to assure proper exposure, the cover will be prevented from closing entirely, the latching mechanism will not function, and the camera cannot be operated, it being understood, of course, that suitable mechanism of types known in the art have been incorporated in the camera to prevent its operation until the cover has been completely closed and locked.

What I claim as new and desire to protect by Letters Patent of the United States is:

1. In a magazine of the character described, a case forming a magazine chamber, a front wall of which comprises an apertured plate for admission of light for film exposure, a cover for the camera case closing said chamber, springs carried by the cover and case and projecting within the magazine chamber, positioned to engage bottom and top rear edges of the magazine to force the same toward the said apertured plate, said case spring having a portion engaging under the magazine, and the spring force thus applied beneath the magazine being greater than any friction between the said spring and magazine, so that when the cover is removed, the said case spring will function to eject the magazine, the said cover springs being shaped to have a component against the magazine such as to force the same into the chamber at right angles to the said apertured plate.

2. The combination defined in claim 1, wherein there is at least one projection on the cover engageable against the magazine to prevent complete closure of the cover if the magazine should not be completely seated.

3. In a magazine of the character described, a case forming a magazine chamber, one wall of which comprises an apertured plate for admission of light for film exposure, a cover for the camera case closing said chamber, springs carried by the cover and case and projecting within the magazine chamber, positioned to engage bottom and top edges of the magazine to force the same toward the said apertured plate, said case spring having a portion engaging under the magazine, and the spring force thus applied beneath the magazine being greater than any friction between the said spring and magazine, so that when the cover is removed, the said case spring will function to eject the magazine, and including at least one projection on the cover engageable against the magazine to prevent complete closure of the cover if the magazine should not be completely seated.

4. In a magazine of the character described, a case forming a magazine chamber, one wall of which comprises an apertured plate for admission of light for film exposure, a cover for the camera case closing said chamber, said chamber having a bottom plate generally parallel with the cover against which the magazine is adapted to be seated, a spring carried by the case and projecting into the magazine chamber, said spring being rounded at an angle so as to have a force component upwardly against a bottom rear edge of a magazine, and forwardly toward said apertured plate, a pair of springs carried by the cover and having a downward and forward component when engaged against a top rear edge of the magazine, said top springs together being stronger than the bottom spring, and an end projection on said case spring engaging under the magazine and extending into a recess in the bottom plate when the magazine is seated, said projection forcing the magazine up with sufficient force to overcome any possible friction of the spring against the magazine, so that opening of the cover will result in ejection of the magazine from its chamber.

5. In a magazine of the character described, a case forming a magazine chamber, one wall of which comprises an apertured plate for admission of light for film exposure, a cover for the camera case closing said chamber, said chamber having a bottom plate generally parallel with the cover against which the magazine is adapted to be seated, a spring carried by the case and projecting into the magazine chamber, said spring being rounded at an angle so as to have a force component upwardly against a bottom rear edge of a magazine, and forwardly toward said apertured plate, a pair of springs carried by the cover and having a downward and forward component when engaged against a top rear edge of the magazine, said top springs together being stronger than the bottom spring, and at least one projection on the cover to engage the magazine and prevent closing of the cover if the magazine is not completely seated, said projection forcing the magazine up with sufficient force to overcome any possible friction of the spring against the magazine, so that opening of the cover will result in ejection of the magazine from its chamber.

6. In a magazine of the character described, a case forming a magazine chamber, a front wall of which comprises an apertured plate for admission of light for film exposure, a cover for the camera case closing said chamber, springs carried by the cover and case and projecting within the magazine chamber, positioned to engage bottom and top rear edges of the magazine to force the same toward the said apertured plate, said case spring having a portion engaging under the magazine, and the spring force thus applied beneath the magazine being greater than any friction between the said spring and magazine, so that when the cover is removed, the said case spring will function to eject the magazine, said case spring being a single spring substantially at a center line of the magazine chamber, and the cover springs comprising two springs on the cover set approximately equi-distantly to the sides of the case spring, the said cover springs together being stronger than the said case spring so as to perform the function of seating the magazine within its chamber.

LEO FRANKEL.

REFERENCES CITED

The following references are of record in the file of this patent:

UNITED STATES PATENTS

| Number | Name | Date |
| --- | --- | --- |
| 1,962,031 | Porter | June 5, 1934 |